(12) United States Patent
Carbone et al.

(10) Patent No.: US 12,494,614 B2
(45) Date of Patent: Dec. 9, 2025

(54) CONTINUOUS WAVE OUTPUT IN A LASER SYSTEM ARRANGED FOR PULSED OUTPUT

(71) Applicant: NLIGHT, INC., Camas, WA (US)

(72) Inventors: Kevin Michael Carbone, Portland, OR (US); C. Geoffrey Fanning, Portland, OR (US); Dennis McCal, Portland, OR (US); Richard Farmer, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 939 days.

(21) Appl. No.: 17/696,789

(22) Filed: Mar. 16, 2022

(65) Prior Publication Data

US 2022/0416496 A1 Dec. 29, 2022

Related U.S. Application Data

(60) Provisional application No. 63/165,051, filed on Mar. 23, 2021.

(51) Int. Cl.
| | |
|---|---|
| *H01S 3/067* | (2006.01) |
| *H01S 3/04* | (2006.01) |
| *H01S 3/094* | (2006.01) |
| *H01S 3/0941* | (2006.01) |
| *H01S 3/102* | (2006.01) |

(52) U.S. Cl.
CPC .......... *H01S 3/0941* (2013.01); *H01S 3/0405* (2013.01); *H01S 3/06704* (2013.01); *H01S 3/094003* (2013.01); *H01S 3/094076* (2013.01); *H01S 3/1024* (2013.01); *H01S 3/0675* (2013.01); *H01S 3/094007* (2013.01); *H01S 3/094053* (2013.01)

(58) Field of Classification Search
CPC ............ H01S 3/0675; H01S 3/094003; H01S 3/094007; H01S 3/094053; H01S 3/094076; H01S 3/1024
See application file for complete search history.

(56) References Cited

U.S. PATENT DOCUMENTS

| | | | | |
|---|---|---|---|---|
| 5,084,880 | A * | 1/1992 | Esterowitz | H01S 3/067 372/71 |
| 2007/0147441 | A1* | 6/2007 | Tominaga | H01S 3/1024 372/6 |
| 2015/0229095 | A1* | 8/2015 | Miyato | H01S 3/08009 372/6 |

(Continued)

*Primary Examiner* — Michael Carter
(74) *Attorney, Agent, or Firm* — Wiley Rein LLP (57) ABSTRACT

Some embodiments may include a fiber laser system comprising: a pump combiner; a plurality of fiber laser pump modules arranged for pumping a pulsed output from the fiber laser system; and a pump controller to operate in a first operation mode to pump a pulsed output from the fiber laser system and to operate in a second different operation mode to pump a continuous wave (CW) output from the fiber laser system; the pump controller to, in the first operation mode, simultaneously activate individual fiber laser pump modules of the plurality of fiber laser pump modules; and the pump controller to, in the second operation mode, sequentially activate the individual fiber laser pump modules of the plurality of fiber laser pump modules. Other embodiments may be disclosed and/or claimed.

20 Claims, 9 Drawing Sheets

(56) References Cited

U.S. PATENT DOCUMENTS

2015/0263480 A1* 9/2015 Xuan ................ H01S 3/094076
372/41
2015/0349481 A1* 12/2015 Kliner ................... H01S 5/4012
359/341.3

* cited by examiner

CONTINUOUS WAVE OUTPUT IN A LASER SYSTEM ARRANGED FOR PULSED OUTPUT

PRIORITY

This application claims priority to U.S. Provisional Application No. 63/165,051 filed on Mar. 23, 2021, entitled CONTINUOUS WAVE OUTPUT IN A LASER SYSTEM ARRANGED FOR PULSED OUTPUT, which is incorporated by reference in its entirety.

TECHNICAL FIELD

The present disclosure relates to fiber lasers.

BACKGROUND

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources. There is great demand for high power and high efficiency diode lasers, the former for power scaling and price reduction (measured in $/Watt) and the latter for reduced energy consumption and extended lifetime.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

A fiber laser system designed for pulsed operation may have very low cooling requirements, with the reduction in the required cooling based on the duty cycle of the fiber laser. For example, a 10% pulse duty cycle would need approximately 10% of the cooling capacity of a fiber laser system that has the same peak power but that was required to operate continuously (this required cooling capacity can be met by air cooling (e.g., fan-driven air cooling)—as opposed to water or other liquid-cooling (which may require a pump, impeller, or the like). This type of fiber laser system may employ multiple individual laser diode pump modules (each pump module may include multiple laser diode chips). During pulsed operation, the individual laser pump diode modules are simultaneously activated (e.g., powered), and then simultaneously deactivated (e.g., unpowered).

On the other hand, a fiber laser system designed for continuous operation is required to operate continuously. As such, a fiber laser system that has the same peak power as the above-described fiber laser system designed for pulsed operation may need approximately ten times the cooling capacity. This greater cooling capacity typically requires complex water cooling systems or other liquid cooling systems.

It would be advantageous to configure a same fiber laser system to have different modes of operation to provide a pulsed output or a continuous wave (CW) output. This would allow an operator to use the same fiber laser system in different modes for different applications, or would allow a manufacturer to utilize a same fiber laser system platform to manufacture fiber laser systems for pulsed operation and fiber laser systems for CW operation. Although CW fiber lasers and pulsed fiber lasers typically have different gain fiber requirements, these requirements could be closely aligned by using a lower peak power in the mode of operation to provide the CW output.

Although the gain fiber requirements may be closely aligned by using a lower peak power for the CW mode of operation, packaging requirements would not be aligned by using the lower peak power in the CW mode of operation. This is because operating the laser diodes at the reduced output also decreases their efficiency. This decrease in efficiency requires more power to the individual pump modules, which increases power supply requirements and cooling requirements. If the individual pump modules are sized to efficiency ranges optimized for continuous operation, the pump modules may not have enough output capacity for pulsed operation.

One possible approach would be to utilize a packaging (e.g., a cooling system and power supply) that meets the highest requirements of both modes of operation. This packaging may utilize water cooling (or other cooling systems that may have high manufacturing costs and/or operating costs) and/or expensive power supplies. Such cooling schemes increase not only the cost and complexity but potentially reduce system reliability, and such power supplies may require complicated and more expensive electronics may be required to regulate power for continuous operation.

Other approaches are possible. Although a fiber laser (or other solid-state laser) system designed to emit high instantaneous power is typically configured using multiple pump modules combined together, a single laser diode module could be used to pump the solid-state or fiber laser during a CW mode of operation (in which the single laser diode is run at, say, full output). Although the decrease from efficiency would not occur (due to running that single laser diode module at, say, full output), the single laser diode module would be operating at much higher average power than the rest of the pump modules in the design. This could require more complicated cooling and electrical power design (continuous operation of such a system requires large input power, and produces considerable waste heat that must be removed without excessively heating the components of the lasers). Therefore, with this possible approach, again the cooling and electrical power design would be essentially driven by the CW mode of operation, which may cost more to provision and/or operate than a fiber laser system optimized based on requirements of a pulsed mode of operation.

In some embodiments described herein, a fiber laser system is configured to operate in a first mode to provide a pulsed output and a second different mode to provide a CW output. In the second different mode, instead of running the laser diodes continuously at a reduced output (which may significantly reduce efficiency as described above), the laser diodes may be run in sequence at full output (or some other selected output corresponding to a threshold efficiency) in the second mode of operation.

Running some or all of the laser diodes in sequence in the second mode of operation may align packaging requirements of the two different modes (which may allow lower cost cooling and power supply solutions to be used in the fiber laser system). Considerably simpler and less expensive design and can, for example, allow air cooling where water or other liquid cooling might have been required for the continuous operating case. Because less power is required such a system might, for example, be powered from a standard home electrical outlet rather than an industrial power outlet required for typical continuously operating high power systems.

Figure 1:
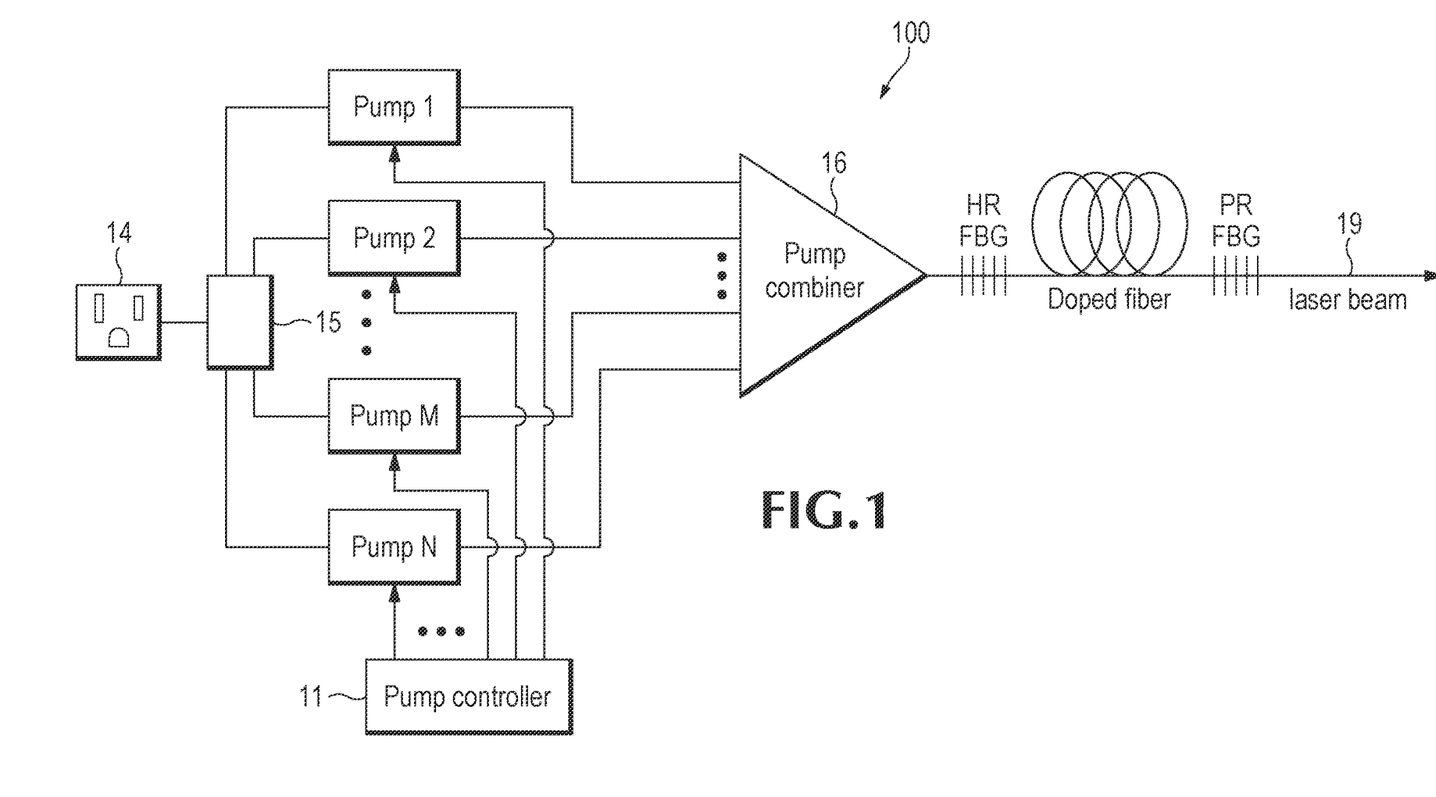
FIG. 1 illustrates a schematic diagram of a fiber laser system arranged for pulsed output, according to various embodiments.

FIG. 1 illustrates a schematic diagram of a fiber laser system 100 arranged for pulsed output, according to various embodiments. In particular, the fiber laser system 100 may have a power supply 15 (e.g., an AC-to-DC power supply) and a cooling system (FIG. 2A) that may be optimized for pulsed output operation (the cooling system may include one or more fans, which may also be powered by the power supply 15). The power supply 15 may be any known power supply used in pulsed output fiber laser systems (e.g., a known AC-to-DC power supply). In some embodiments, given the duty cycle, the power supply 15 may be powered by a residential AC power source 14 (e.g., a 110-120 Volt AC plug on a 15 A circuit or a 20 A circuit), although this is not required.

The system 100 includes individual laser diode pump modules 1-N having outputs coupled to inputs of a pump combiner 16, which outputs the combined pump light to an input of a doped fiber to generate a laser beam 19 (which may be pulsed) at an output of the fiber laser system 100. In some embodiments, N is equal to ten, but N can be more or less in other embodiments (in various embodiments, N may be equal to any number greater than one). To generate the laser beam 19 having a pulsed output, the pump controller 11 may simultaneously activate all N individual laser diode pump modules 1-N at a duty cycle, e.g., a 10% duty cycle.

Figure 2A:
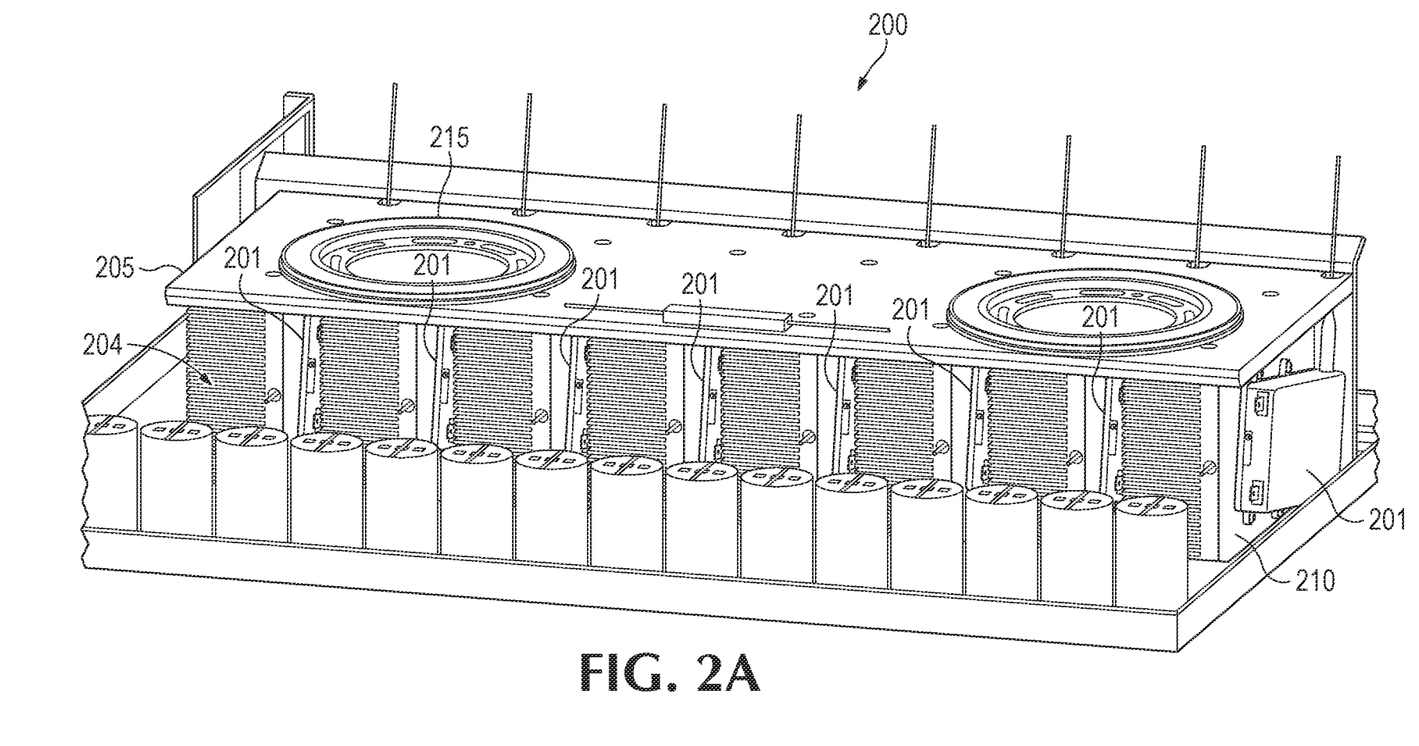
FIG. 2A illustrates an isometric view of packaging for the fiber laser system of FIG. 1, according to various embodiments.
Figure 2B:
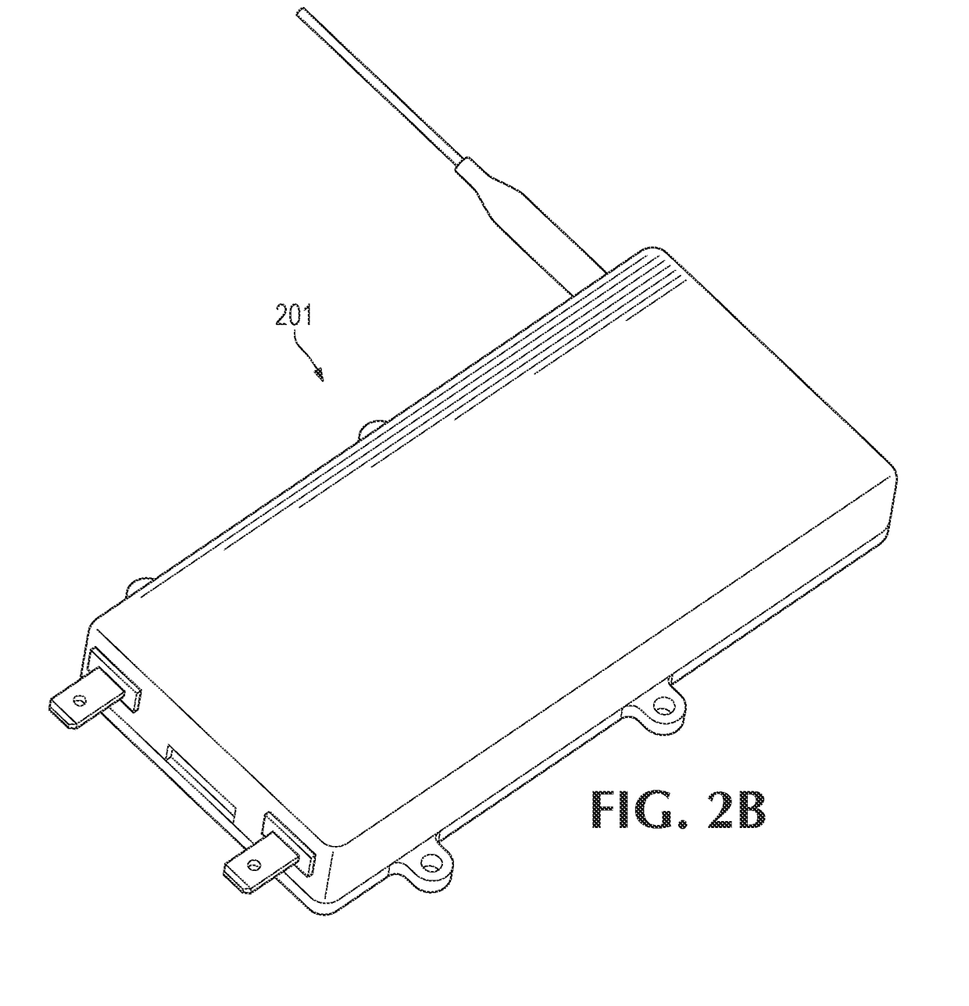
FIG. 2B illustrates an isometric view of packaging of an individual laser diode pump module of the fiber laser system of FIG. 1, according to various embodiments.

FIG. 2A illustrates an isometric view of packaging 200 for the fiber laser system of FIG. 1, according to various embodiments. The packaging 200 may include individual air-cooled heat sinks 210 thermally coupled to the individual laser diode pump modules 201, respectively (each individual pump module 201 may be mounted to a bottom of a corresponding one of the heat sinks 210, which are positioned on their sides). FIG. 2B illustrates an isometric view of an individual one of the laser diode pump modules 201. Referring again to FIG. 2A, in this embodiment, the packaging 200 may be located in a housing (not shown) that provides a plenum from the spacing 204 in front of the individual air-cooled heat sinks 210. One or more fans mounted to, say, the front of the housing may drive air from outside the casing into the plenum, which may force the air through the individual heat sinks 210 and expel heated air out of a back of the housing. The entire system may be powered by the power supply 15 (FIG. 1).

In this embodiment, the individual air-cooled heat sinks 210 may be thermally coupled to a first side of a metal plate 205 (e.g., a cold plate). The second side of the metal plate 205 may have fiber packaging 215 (e.g., a coil or some other fiber packaging for the doped fiber) thermally coupled thereto (as such the fiber packaging/fiber may also be thermally coupled to the individual air-cooled heat sinks 210).

Liquid cooling may require a pump, impeller, or the like, which may require more current to drive than the current required to drive a fan to drive air into a plenum formed from the spacing 204. Therefore, the use of air-cooling (e.g., without liquid cooling) may contribute to keeping the total power consumption requirements of the fiber laser system 100 (FIG. 1) within a threshold associated with a given power source 14, say a residential power source. The reduced power usage of an air-cooled system may also relax power supply requirements (which could reduce the cost of the power supply 15— FIG. 1). Also, a fan driving air may require less overall operating costs (e.g., less maintenance and/or electricity costs) than a pump or impeller, in addition to the cost reduction from avoiding design complications of the tubing and chambers required for liquid cooling.

Figure 3A:
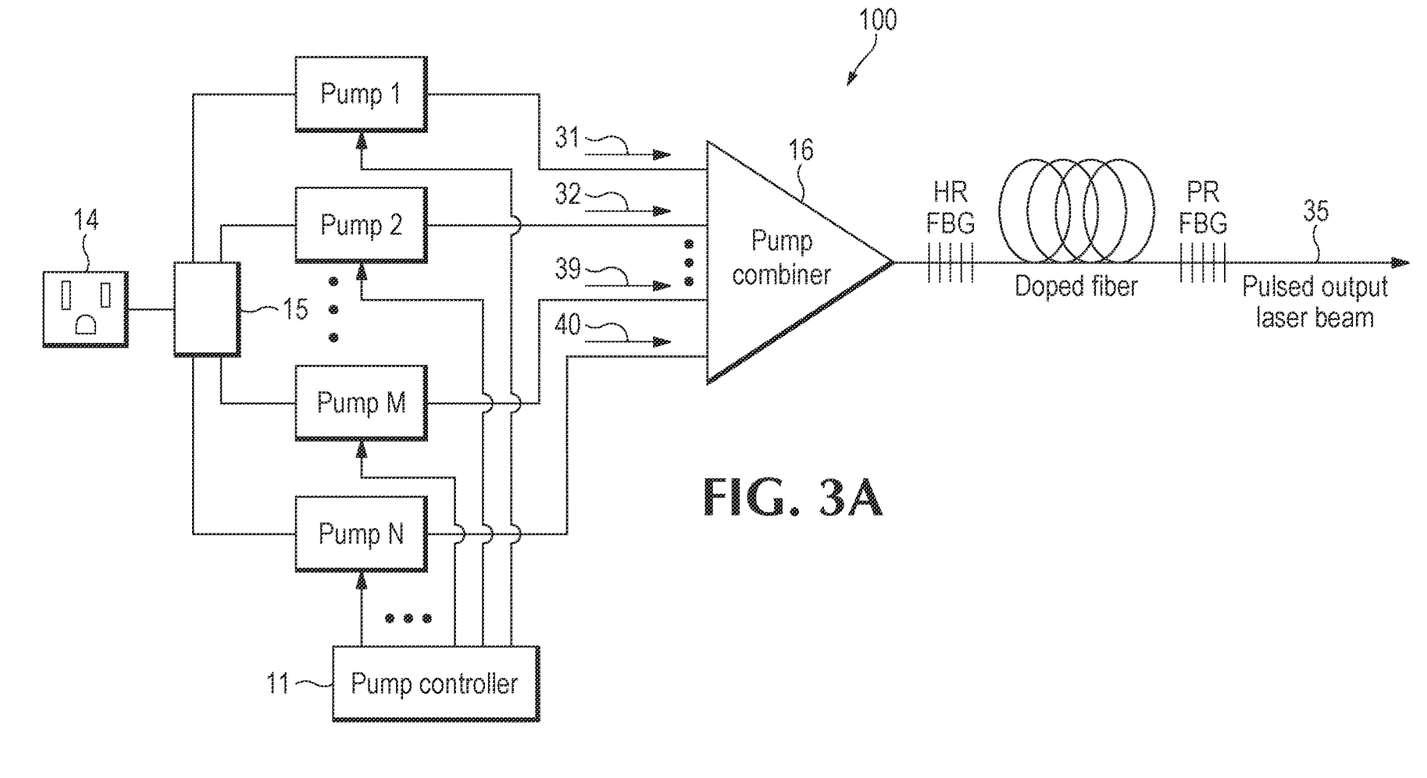
FIG. 3A-B illustrates the fiber laser system of FIG. 1 at a first time and a second time, respectively, during a first mode of operation to generate the pulsed output, according to various embodiments.
Figure 3B:
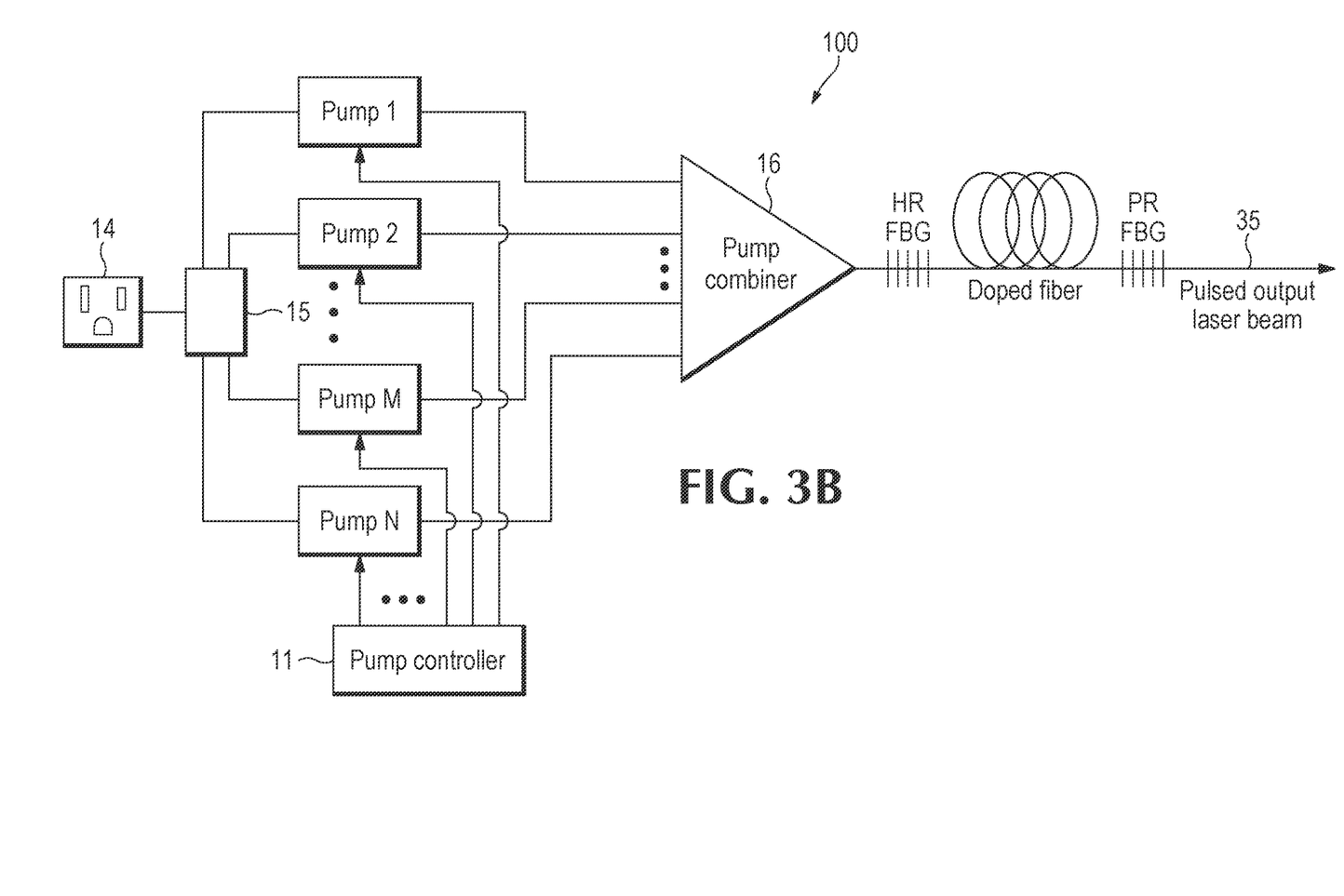
Figure 5A:
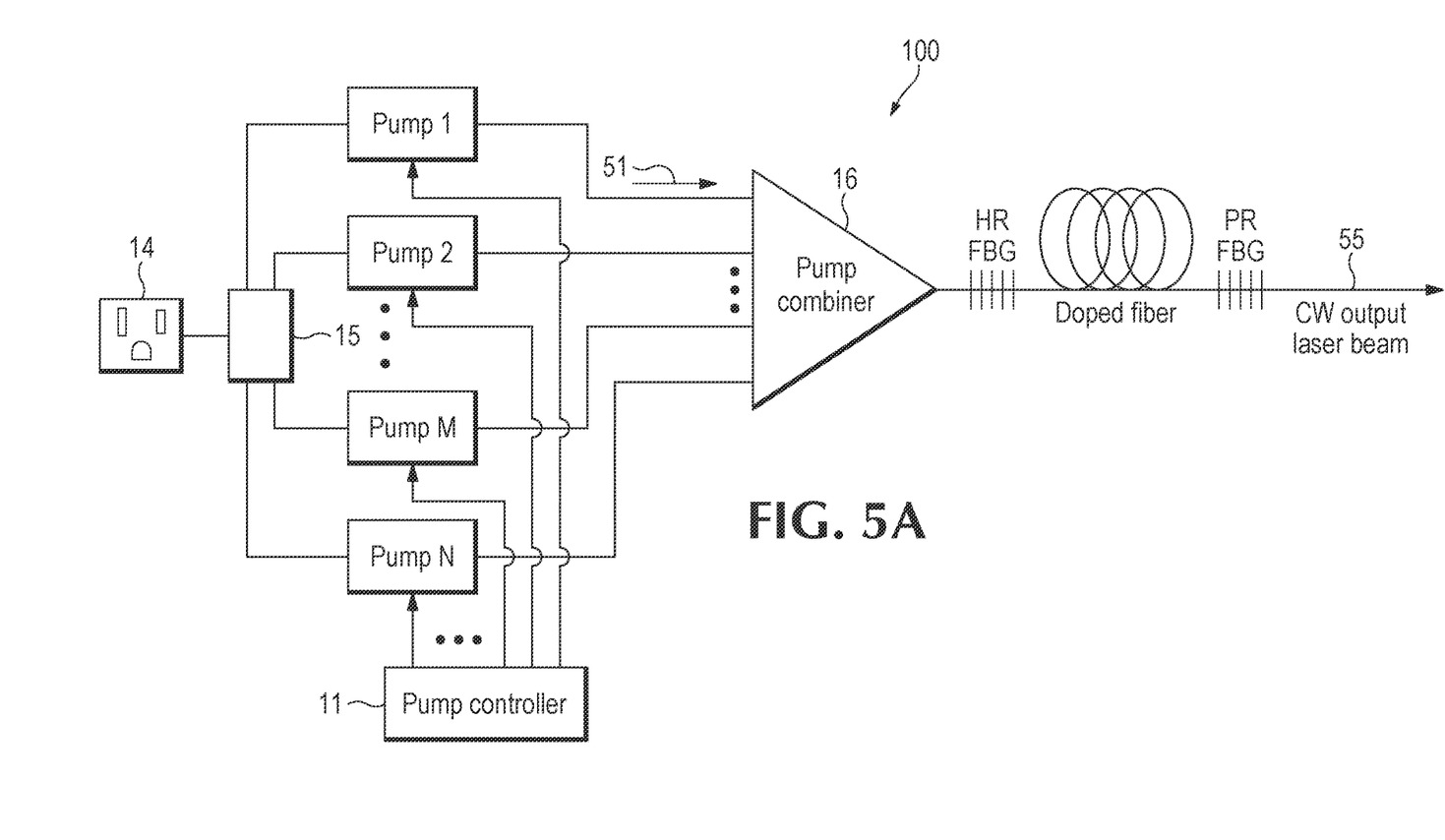
FIG. 5A-B illustrates the fiber laser system of FIG. 1 at a first time and a second time, respectively, during a second mode of operation to generate a CW output, according to various embodiments.
Figure 5B:
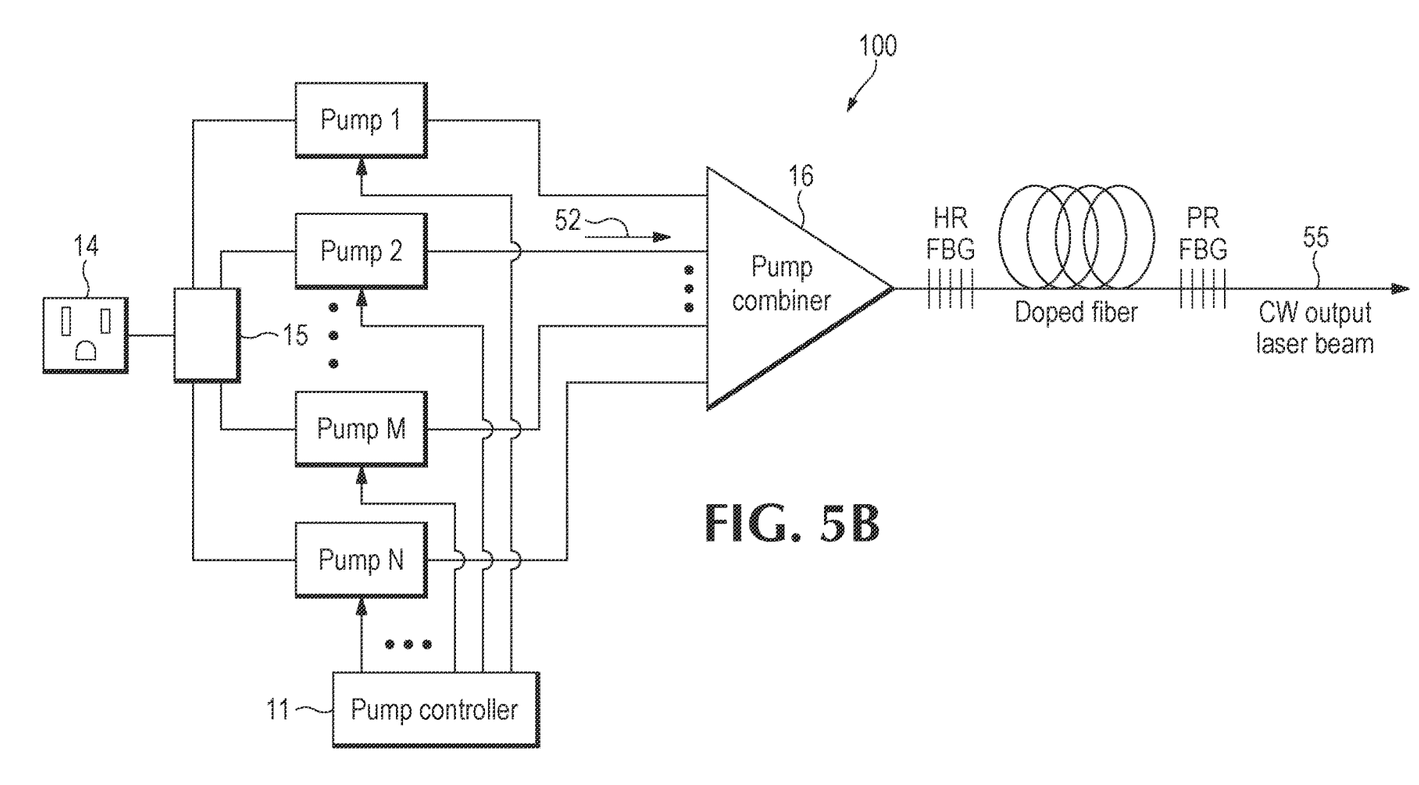

Referring variously now to FIGS. 1, 3A-B, and 5A-B, the pump controller 11 may be configured to operate in two different modes. In the first mode of operation, the fiber laser system 100 generates a pulsed output laser beam 35 (FIGS. 3A-B). In the second mode of operation, the fiber laser system 100 generates a CW output laser beam 55 (FIGS. 5A-B).

The different modes are controlled by the pump controller 11, which is arranged to activate the pump modules 1-N simultaneously (to generate the pulsed output laser beam 35) or sequentially activate the pump modules 1-N (to generate the CW output laser beam 55). The pump controller 11 may be implemented using any known circuitry. In some embodiments, the circuitry may include a memory storing instructions that, when executed by a processor, perform any of the functions described herein. In other embodiments, the circuitry may be logic or some other special purpose hardware.

In the illustrated embodiment, the pump controller 11 controls circuitry in each of the laser diode pump modules 1-N to individually activate or deactivate the corresponding laser diode pump modules 1-N. This circuitry inside the laser diode pump modules 1-N may be Laser Diode Drive (LDD) circuitry. In other embodiments, it may be possible or practical to activate or deactivate the corresponding laser diode pump modules 1-N by signaling the power supply 15 alone or in combination with signaling the circuitry inside the laser diode pump modules 1-N.

In the first mode of operation to generate the pulsed output laser beam 35, referring now to FIG. 3A which illustrates a first time corresponding to simultaneous activation, the pump controller 11 activates all the pump modules 1-N to generate outputs (the pulsed output laser beam 35 is generated from illustrated pump light 31, 32, 39, and 40) received by the inputs of the pump combiner 16. At a second later time corresponding to a time period of deactivation (as shown in FIG. 3B), none of the pump modules 1-N output light (which defines the pulse in the pulsed output laser beam 35). The time period of deactivation may be nine times as long as the time period of activation (10% duty cycle), or some other ratio depending on application requirements.

Referring now to FIG. 5A, in the second mode of operation to generate the CW output laser beam 55, at a first time the pump controller 11 activates pump module 1 only (or some other grouping of less than all the pump modules 1-N depending on application requirements). Therefore, the pump module 1 outputs pump light 51 in a first time period, and the CW output laser beam 55 is generated from this pump light 51 during the first time period. Referring to FIG. 5B, in a next second time period, the pump controller 11 activates pump module 2 only (or some other different grouping of less than all the pump modules 1-N depending on application requirements). Therefore, the pump module 2 outputs pump light 52 in a second time period, and the CW output laser beam 55 is generated from this pump light 52 during the second time period. The process may repeat in a similar fashion for a next pump module of the pump modules 1-N (or a next different grouping of less than all the pump modules 1-N in other embodiments) to activate all the pump modules 1-N in sequence (or all the different grouping of the pump modules 1-N in other embodiments), and then the process restarts with the pump module 1 (or the first grouping of the pump modules 1-N).

In embodiments in which different groupings of less than all of the pump modules 1-N are activated in sequence, the counts of each grouping may be the same or different. In any case, the sequential activations of the different groupings may provide some periods of inactivity for each of the pump modules 1-N, which may prevent overheating.

It is not required to utilize all the pump modules in the second mode of operation. In some embodiments, only a subset of the pump modules 1-N may be used sequentially depending on application requirements for the CW output laser beam 55. In these embodiments, it may be possible and practical for the pump controller 11 to rotate which pump modules 1-N are included in the subset over time so that any wearing is uniform across the pump modules 1-N.

In some embodiments, the duration of each time period may be the same or different. Typically, with laser diodes, the threshold current and current-to-optical slope efficiency of each pump diodes is slightly different. To equalize the output, the pump controller 11 may characterize the different laser diode pump modules 1-N and store the operating parameters in a memory of the pump controller 11. The pump controller 11 may use this information so that the correct Laser Diode Drive (LDD) current is supplied when the corresponding laser diode pump module 1-N is activate. LDD circuitry of the laser diode pump modules 1-N may have finite turn-on and turn-off times. To reduce ripple in the continuous output caused by dropouts in power switching between laser diode pump modules 1-N, the pump controller 11 may characterize these differences so the pump controller 11 may turn LDDn ON by the correct amount before LDDN-1 is turned off, thus the power is sustained through the switch from one pump module (or pump module grouping) to the next.

Figure 4:
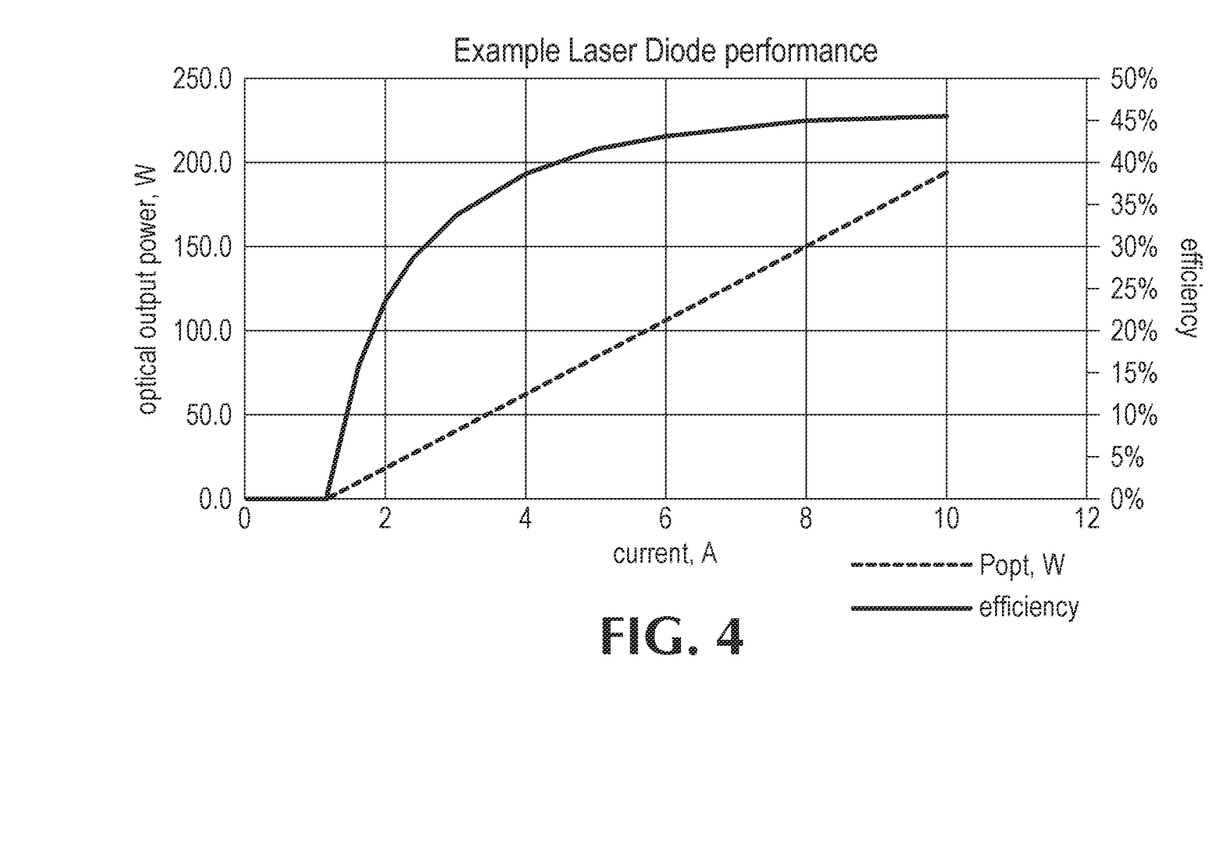
FIG. 4 is a graph illustrating laser diode performance as a function of input current.

FIG. 4 is a graph illustrating laser diode performance as a function of input current. As illustrated, as current usage by a laser diode drops, efficiency inflects from a shallow slope (magnitude of run greater than magnitude of rise) to a steep slope (magnitude of rise greater than magnitude of run) because laser diodes used as pumps for solid-state and fiber lasers are much more efficient when operated at currents well above the threshold current at which they begin to emit light. In the various embodiments, in second mode of operation the laser diode pump modules may be operated at currents exceeding this power efficiency curve inflection. Operating the laser diode pump modules 1-N in sequence at these currents during the second mode of operation to generate the CW output laser beam allows the power supply 15 (FIG. 1) and cooling system (FIG. 2A) that are optimized for pulsed output laser operation to be used during the CW output operation.

Figure 6:
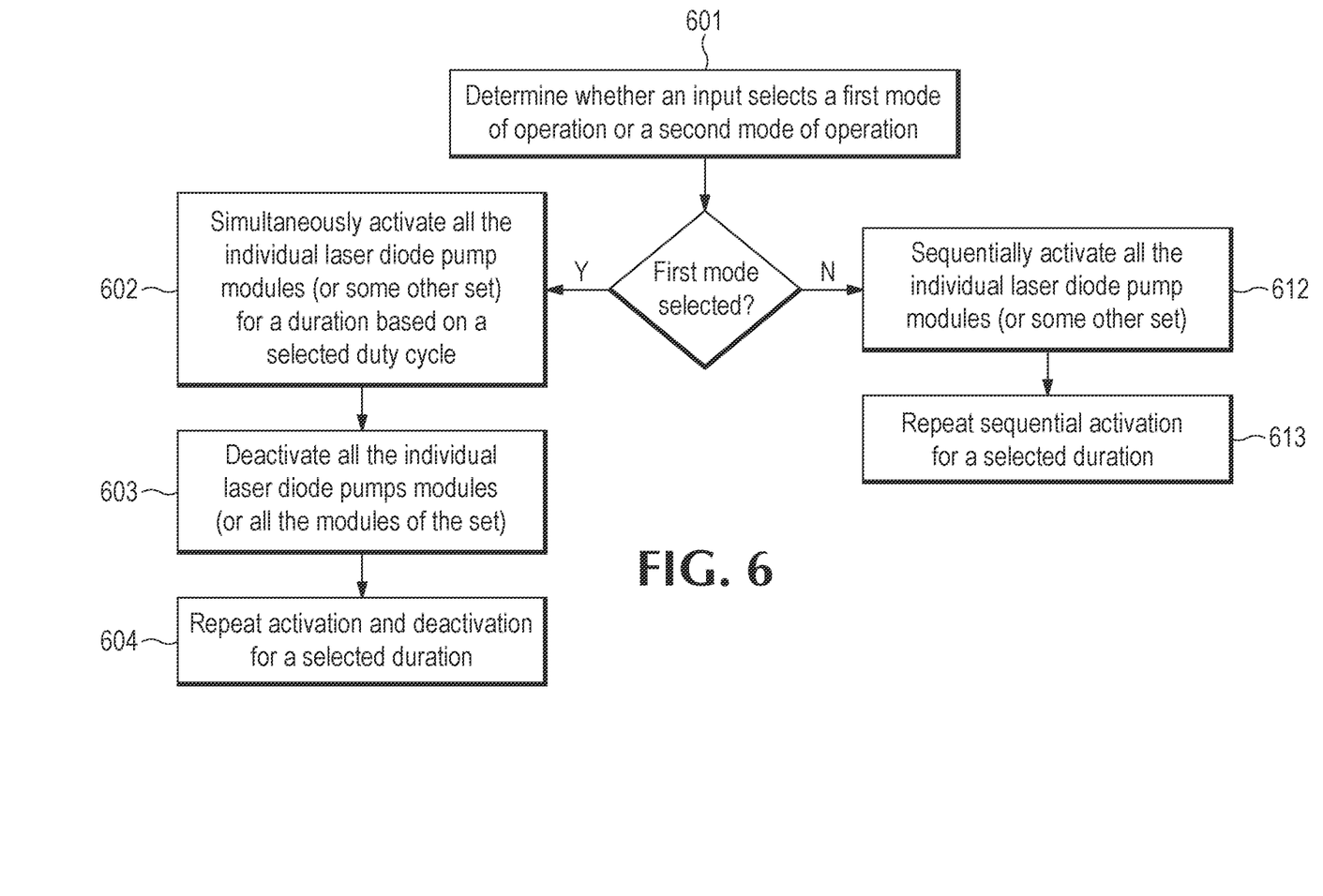
FIG. 6 is a flowchart illustrating operations performed by the pump controller of FIG. 1, according to various embodiments.

FIG. 6 is a flowchart illustrating operations performed by the pump controller 11 of FIG. 1, according to various embodiments. In block 601, the pump controller 11 may determine whether an input selects a first mode of operation or a second mode of operation. In one embodiment, the pump controller 11 may determine the mode of operation based on a peak power request from the fiber laser system. For example, a user may indicate a desired instantaneous output power using a 0 to 10V analog input voltage representing 0 to 100% of the possible output power. If the request is within a predefined range for CW operation, the pump controller 11 may automatically configure CW operation as a default (in some embodiments it may be possible for a user to request pulsed output at a range normally associated with CW operation). In various embodiments, the pump controller 11 may determine the mode of operation directly or indirectly from a user input made by a user terminal, a jumper, or the like, or combinations thereof (in an example of indirectly a different component of the fiber laser system may parse a user input and enter a mode of operation based on it, and pump controller may determine whether the first or second mode of operation is selected based on the mode of operation entered by the other component).

If the first mode of operation is selected, in block 602 the pump controller 11 may simultaneously activate all the individual laser diode pump modules (or some other set) for a duration based on a selected duty cycle for the pulsed output laser beam. A quantity of modules in the set may be based on application requirements. Next, the pump controller 11 may deactivate all the individual laser diode pump modules (or all the modules of the set) until a next duty cycle. The activation/deactivation may be repeated one or more times in block 604 according to a selected duration of an input or some other condition occurs.

If the second mode of operation is selected, in block 612 the pump controller 11 may sequentially activate all the individual laser diode pump modules (or all the pump modules of some other set depending on application requirements). Sequential activation may include one-by-one activation or grouping-by-grouping activation (where each grouping includes less than all of the individual fiber laser pump modules and the groupings are different). The sequential activation may be repeated one or more times in block 613 according to a selected duration of an input or until some other condition occurs.

Some of the equipment discussed above comprises hardware and associated software. For example, the typical pump controller is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. A fiber laser system, comprising:
a pump combiner;
a plurality of fiber laser pump modules arranged for pumping a pulsed output from the fiber laser system, wherein the plurality of fiber laser pumps includes a plurality of outputs coupled to a plurality of inputs of the pump combiner; and
a pump controller to operate in a first operation mode to pump a pulsed output from the fiber laser system and to operate in a second different operation mode to pump a continuous wave (CW) output from the fiber laser system, the pump controller further to:
in the first operation mode, simultaneously activate individual fiber laser pump modules of the plurality of fiber laser pump modules; and
in the second operation mode, sequentially and iteratively activate the individual fiber laser pump modules of the plurality of fiber laser pump modules.

2. The fiber laser system of claim 1, wherein the plurality of fiber laser pumps is powered using a same power supply and power source in both the operation modes.

3. The fiber laser system of claim 2, wherein a maximum power output of the power supply coincides with power usage in the first operation mode.

4. The fiber laser system of claim 2, further comprising a cooling system arranged to dissipate heat at a rate corresponding to maximum power dissipation requirements associated with the different operation modes, wherein the maximum power dissipation requirement associated with the second operation mode is not greater than the maximum power dissipation requirement associated with the first operation mode.

5. The fiber laser system of claim 4, wherein the cooling system is arranged to dissipate heat generated by the fiber laser system without a liquid.

6. The fiber laser system of claim 4, wherein the cooling system comprises a fan.

7. The fiber laser system of claim 6, wherein a sequence of operations of the individual fiber laser pump modules in the second operation mode is selected based on an acoustic requirement associated with the at least one fan.

8. The fiber laser system of claim 1, wherein a sequence of operations of the individual fiber laser pump modules in the second operation mode is selected based on one or more characteristics of a power source for the fiber laser system.

9. The fiber laser system of claim 8, wherein:
the power source comprises a 120V or less power outlet, or
the one or more characteristics comprise a maximum current of the power source, wherein the maximum current supply of the power source is 20 A or less.

10. The fiber laser system of claim 1, wherein sequentially and iteratively activate the individual fiber laser pump modules of the plurality of fiber laser pump modules comprises:
iteratively activating the individual fiber laser pump modules one-by-one; or
iteratively activating the individual fiber laser pump modules grouping-by-grouping, wherein each grouping includes less than all of the individual fiber laser pump modules and the groupings are different.

11. An apparatus to control a fiber laser system, the apparatus comprising:
a memory storing instructions that, when executed by a processor, cause the processor to perform operations, comprising:
determining whether to operate in a first operation mode for pumping a pulsed output from the fiber laser system or in a second different operation mode for pumping a continuous wave (CW) output from the fiber laser system;
in response to a determination to operate in the first operation mode, simultaneously activating individual fiber laser pump modules of the fiber laser system; and
in response to a determination to operate in the second operation mode, sequentially and iteratively activating the individual fiber laser pump modules.

12. The apparatus of claim 11, wherein the individual fiber laser pumps are powered using a same power supply and power source in both the operation modes.

13. The apparatus of claim 12, wherein a maximum power output of the power supply coincides with power usage in the first operation mode.

14. The apparatus of claim 12, wherein the fiber laser system includes a cooling system arranged to dissipate heat at a rate corresponding to maximum power dissipation requirements associated with the different operation modes, wherein the maximum power dissipation requirement associated with the second operation mode is not greater than the maximum power dissipation requirement associated with the first operation mode.

15. The apparatus of claim 14, wherein the cooling system is arranged to dissipate heat generated by the fiber laser system without a liquid.

16. The apparatus of claim 14, wherein the cooling system includes at least one fan.

17. The apparatus of claim 14, wherein a sequence of operations of the individual fiber laser pump modules in the second operation mode is selected based on an acoustic requirement associated with the at least one fan.

18. The apparatus of claim 11, wherein a sequence of operations of the individual fiber laser pump modules in the second operation mode is selected based on one or more characteristics of a power source for the fiber laser system.

19. The apparatus of claim 18, wherein:
the power source comprises a 120V or less power outlet, or
the one or more characteristics comprise a maximum current of the power source, wherein the maximum current supply of the power source is 20 A or less.

20. The apparatus of claim 11, wherein sequentially and iteratively activating the individual fiber laser pump modules of the plurality of fiber laser pump modules comprises:
iteratively activating the individual fiber laser pump modules one-by-one; or
iteratively activating the individual fiber laser pump modules grouping-by-grouping, wherein each grouping includes less than all of the individual fiber laser pump modules and the groupings are different.

* * * * *